United States Patent [19]

Tsutsumi

[11] Patent Number: 4,704,516
[45] Date of Patent: Nov. 3, 1987

[54] POINTED HEAT-GENERATING DEVICE FOR MOLDS OF INJECTION MOLDING MACHINES

[76] Inventor: Shigeru Tsutsumi, 1165 Touyama-Mach, Yonezawa-shi, Yamgataken, Japan

[21] Appl. No.: 770,649

[22] Filed: Aug. 28, 1985

[30] Foreign Application Priority Data

Aug. 31, 1984 [JP] Japan ............................. 59-180308

[51] Int. Cl.⁴ ............................................. H05B 3/48
[52] U.S. Cl. ..................................... 219/421; 219/426
[58] Field of Search ............... 219/421, 420, 422, 423, 219/426; 425/547, 548, 549, 551, 564, 566, 568; 222/146.2, 146.5

[56] References Cited

U.S. PATENT DOCUMENTS 3,800,027  3/1974  Tsutsumi ............................. 425/547
4,438,064  3/1984  Tsutsumi ............................. 425/548

FOREIGN PATENT DOCUMENTS 0043234  1/1982  European Pat. Off. ............ 425/549
2134440  8/1984  United Kingdom ................ 425/547

Primary Examiner—E. A. Goldberg
Assistant Examiner—Teresa J. Walberg
Attorney, Agent, or Firm—Michael J. Striker

[57] ABSTRACT

A heater is incorporated in a pointed conical heat-generating means fixed with a projectile heat-generating body. The heater is a ceramic columnar body having a heat resisting and insulating property. Disposed within the ceramic columnar body is a coiled heating wire of which winding diameter is formed as small as possible. Due to discontinuous energizing process of the heater, thermoplastic synthetic resin adjacent a gate can be heated and fused, or cooled and solidified intermittently, thereby the gate communicated with a cavity can be opened or closed effectively.

14 Claims, 10 Drawing Figures

Prior Art

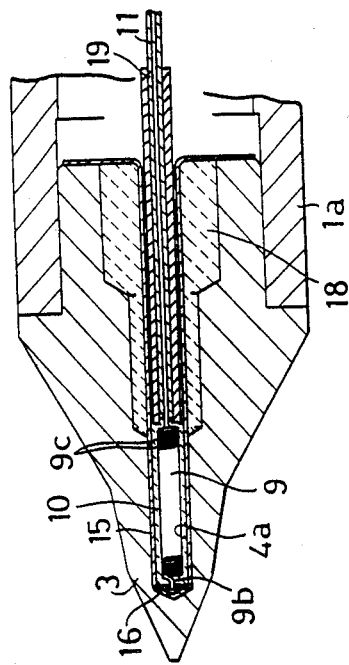
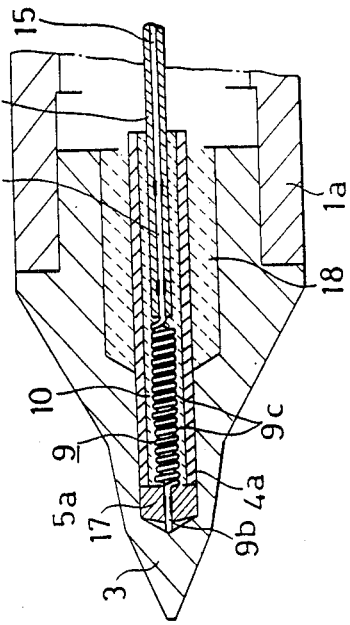
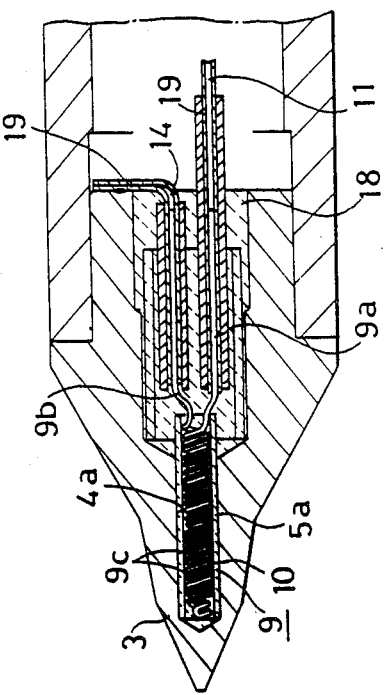
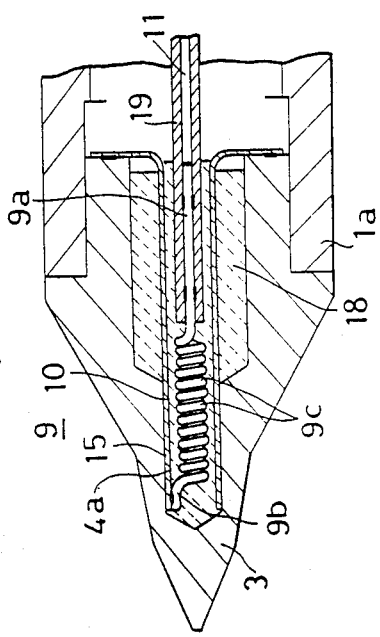

POINTED HEAT-GENERATING DEVICE FOR MOLDS OF INJECTION MOLDING MACHINES

BACKGROUND OF THE INVENTION (1) Field of the Invention

This invention relates to a pointed heat-generating device for molds of injection molding machines which enables an accurate injection molding operation.

(2) Description of the Prior Art

In FIGS. 1 to 3 there is shown a conventional pointed heat generating device of this kind. It is disclosed in U.S. Pat. No. 4,516,927 and European Pat. No. 0 043 234 B1, both of which correspond to Japanese Unexamined Patent Publication No. 57-11017 in the name of the present applicant.

Referring to FIG. 1, numeral 1 is a projectile heat-generating body 1 which comprises a cylindrical metal casing 2 and a pointed conical heat-generating means 3 fixed therewith.

The pointed conical heat-generating means 3 is provided, on its axis, with a passage 4. Penetrated wholly into the passage 4 is a rod-type heating wire 5 until its end reaches a pointed end of the heat-generating means 3. The rod-type heating wire 5 which is a nichrome wire is inserted into an insulating tube 5a.

Associated with the rod-type heating wire 5 is an alloy portion X of wear resistance which is nearly equivalent to a material of the heat-generating means 3.

How to make the alloy portion X will now be described in connection with FIGS. 2 and 3.

First of all, the passage 4 is bored in a cylindrical non-processed material 3', and a nichrome wire inserted into the insulating tube 5a is inserted as the heat-generating wire 5 into the passage 4. An end of the cylindrical non-processed material 3' and an end of the heat-generating means 3 are fused locally and united to each other in such an inert gas as argon and converted into an integral part, i.e. the alloy portion X by means of arc discharge.

Thus, the alloy portion X has the nearly same wear resistant property as the heat-generating means 3. By cutting and processing the cylindrical non-processed material 3', there is formed the pointed heat-generating means 3 having the alloy portion X as a peak.

The alloy portion X is connected to an end of the heating wire 5 and earthed to the metal casing 2 by way of the heat-generating means. Another end of the heating wire 5 is connected to a back lead wire 6 by passing through the passage 4.

Numeral 7 is a heater which is coiled along an internal circumpherence of the metal casing 2. The coiled heater 7 is to heat and fuse the thermoplastic synthetic resin which flows and retains along the external circumpherence of the metal casing 2. Numeral 8 is a lead wire connected to the heating wire 5.

Since the heating wire 5 is incorporated longitudinally within the heat-generating body 1 and not exposed outwardly, the pointed heat-generating means 3 can maintain a high wear resistance. However, the disadvantage of the heating wire 5 is that it is simply rod-type, so that the speed of heat conductivity is delayed. In order to obtain a high temperature heat rapidly and effectively, such conventional heating wire has needed electric power of more than 120 W, 8 volts and 15 amperes. Accordingly, a large-sized transformer having high capacity is absolutely required even when producing small-sized molding articles. Thus, it raises the production cost.

BRIEF SUMMARY OF THE INVENTION

It is a general object of this invention to provide a pointed heat-generating means for molds of injection molding machines, in which unlike a conventional rod-type heating wire, a heater means having a high heat-generating effect is disposed longitudinally within a pointed conical heat-generating means.

More specifically, the heater means is a ceramic columnar body having a heat resisting and insulating property. Disposed within the ceramic columnar body is a coiled heating wire of which winding diameter is formed as small as possible. Such ceramic columnar body is disposed so as to be accessible to a pointed end of the pointed conical heat-generating means. A lead wire of the coiled heating wire is connected electrically to a pointed end of the pointed heat-generating means and another lead wire thereof is connected to a lead wire disposed in a passage of a heat-generating body. The power consumption of this small-sized heater means is a few watts and the electric voltage is very small.

Other and further objects, features and advantages of this invention will become apparent from the following description taken in connection with the accompanying drawings.

BRIEF DESCRIPTION OF THE ACCOMPANYING DRAWINGS

FIGS. 7 to 10 are sectional side views of various modifications of the heater means and its lead wire.

PREFERRED EXAMPLES OF THE INVENTION

Figure 4:
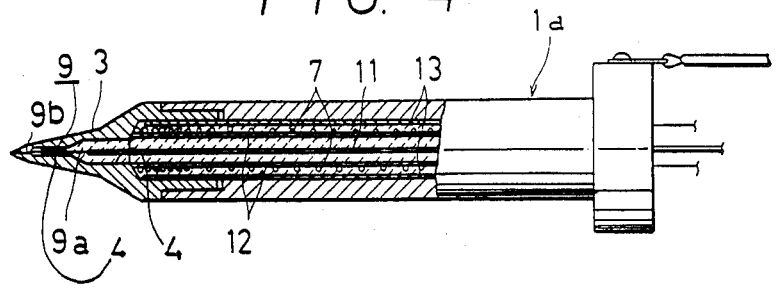
FIG. 4 is a sectional side view of an example of a pointed heat-generating device for molds of injection molding machines according to this invention.
Figure 5:
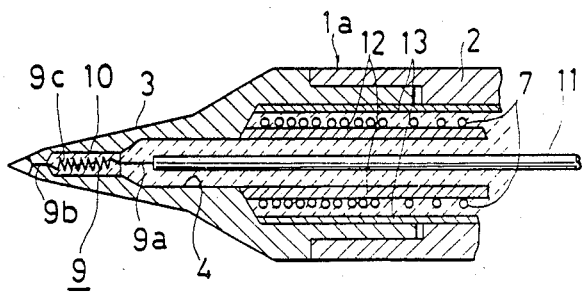
FIG. 5 is an expanded sectional side view of a main part in FIG. 4.

A preferred example of the invention will be described with reference to FIGS. 4 to 6.

Figure 1:
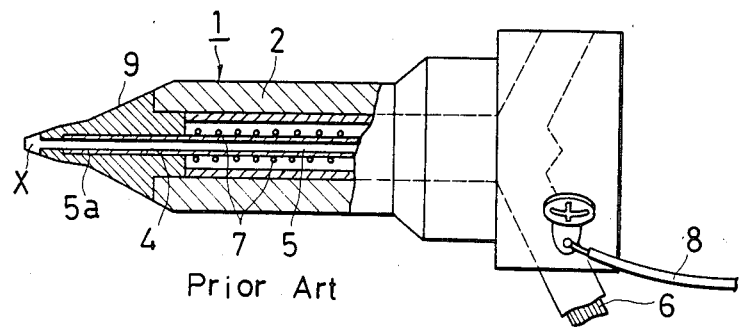
FIG. 1 is a sectional side view of a conventional pointed heat-generating device for molds of injection molding machines.
Figure 2:
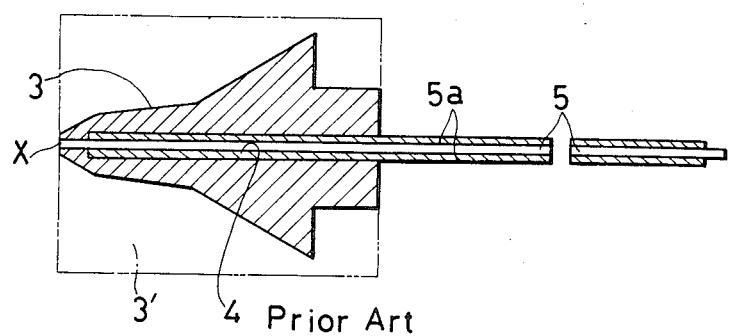
FIG. 2 is an expanded section view of showing a conventional process for forming an alloy portion where an end of a rod-type heating wire and an end of a heat-generating means adjoin to each other.
Figure 3:
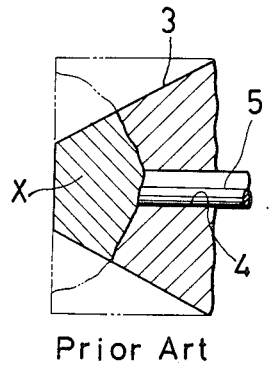
FIG. 3 is a further expanded section view of FIG. 2.

Since the same features of construction as shown in FIGS. 1 to 3 have the same numerals, their description will be omitted.

Numeral 9 is a heater means comprising a ceramic columnar body 10, lead wires 9a, 9b at its two side ends and a coiled heating wire 9c disposed in the ceramic columnar body 10. The coiled heating wire 9c is preferably a nichrome wire of which surface is insulated and of which diameter is 0.1 mm to 0.6 mm. The winding diameter of the coiled heating wire 9c is about 1.3 mm to 2 mm. The current intensity of the coiled heating wire 9c is about 2.5 amperes and the electric voltage is about 4 V, so that the consumption of electric power is very small. In addition, it is possible to increase the heat of the coiled heating wire 9c to 900° C. to 1,000° C. at temperature. The ceramic columnar body 10 has an excellent heat resistance property as well as an excellent wear resistance property. The coiled heating wire 9c can be disposed firmly within the ceramic body 10 by means of a simple baking process. The heater means 9 adjoins fixedly to an end of the passage 4 of a projectile heat-generating body 1a, i.e. an end of the pointed conical heat-generating means 3 which constitutes a tip.

Numeral 11 is a lead wire of the heater means 9 connected to the lead wire 9a. The lead wire 11 is disposed longitudinally within the passage 4. Another lead wire 9b of the heater means is communicated with the end of the heat-generating means 3 by means of melting. Thus, there is formed the alloy portion X which has the nearly same wear resistance property as the material of the heat-generating means 3.

Under such circumstances, when heating the heater means 9 by supplying electric current between the lead wire 11 of the heater means 9 and the projectile heat-generating body 1a, Joule heat is generated from the coiled heating member 9c and transferred imxediately to the pointed heat-generating means 3. Thus, heat is radiated outwardly from the surface of the pointed heat-generating means 3. When it is disposed in a runner (not illustrated) positioned on the surface of the pointed heat-generating means 3 so as to adjoin to a gate (not illustrated) communicated with a cavity, thermoplastic synthetic resin in the proximity of the gate is heated and fused.

When stopping energizing of the heater means 9, the coiled heating wire 9c thereof ceases immediately heat generation and heat is not transferred to the heat-generating means 3. Thus, heat radiation from the surface of the pointed heat-generating means 3 disappears and the thermoplastic synthetic resin is cooled and solidified.

Consequently, the thermoplastic synthetic resin adjacent the gate can be heated and fused, or cooled and solidified intermittently by discontinuous energizing process of the heater means 9, thereby the gate communicated with the cavity can be opened or closed and a preferred runnerless injection molding operation can be carried out.

An example of FIG. 7 will be referred to hereinafter.

Since the same features of construction as shown in FIGS. 1 to 6 have the same numerals, their description will be omitted.

According to this example, the coiled heating wire 9c of the heater means 9 is formed by a double nichrome wire. The nichrome wire having a certain length is bent in 360 degrees on its center and transformed into a double wire as shown in FIG. 7. The bent part of the double wire as a starting point is coiled and finally two lead wires 9a, 9b are formed in the same direction. Such coiled heating wire 9c is disposed in the ceramic columnar body 10 and enclosed by an insulating tube 5a. As shown in FIG. 10, the heater means 9 having the aforesaid structure is incorporated longitudinally within a passage 5a of the pointed heat-generating means 3.

The lead wire 9b is connected and earthed to an end of the pointed heat-generating means 3 by way of a lead wire 14.

Numeral 18 is a ceramic filler and numeral 19 is a conduit for inserting the lead wires 9a, 9b respectively therein.

Figure 6:
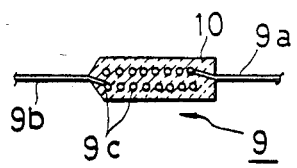
FIG. 6 is a section view of a heater means in FIGS. 4 and 5.

Referring to an example of FIG. 8, the heater means 9 of FIG. 6 is inserted into an electrically conductive tube 15 made of a stainless steel, in which the lead wire 9b of the heater means 9 is fixed with the conductive tube 15. Thus, the conductive tube 15 is electrically connected and earthed to the pointed heat-generating means 3.

Referring to an example of FIG. 9, the lead wire 9b of the heater means 9 is connected to the conductive tube 15 by means of welding. The other construction of FIG. 9 is the same as the construction of FIG. 8. The lead wire 9a is fixed partially with the conduit 19 by welding.

Referring to an example of FIG. 10, the heater means 9 includes an electrically conductive mass 17 such as a stainless sleeve. The lead wire 9b passes through a center path of the conductive mass 17 and connects to the pointed heat-generating means 3. The heater means 9 is inserted into the insulating tube 5a.

According to one aspect of this invention, the heater means is provided with the coiled heating wire of which diameter is very small and of which winding diameter is also very small. Such heater means is disposed longitudinally within the pointed conical heat-generating means in order to heat it locally. Thus, the pointed conical heat-generating means is heated rapidly and heat is radiated from the surface of it. In addition, the heater means is a ceramic columnar body having a superior heat resisting and insulating property as well as a superior wear resistance, so that it can be used for a long time.

According to another aspect of this invention, the power consumption of the heater means is very small. For example, 3 volts, 3 amperes and 9 watts are quite sufficient. Therefore, it is not necessary to prepare a large-sized transformer having high capacity. As a result, the heater means built-in can be formed compactly, thereby the diameter of a lead wire can be small. Then, it is possible to bind a large number of thin lead wires.

Still further, a lead wire of the heater means can be connected and fixed with the pointed conical heat-generating means by various connecting and fixing means including a pressing means.

While I have shown and described certain embodiments of my invention, it is to be understood that it is capable of many modifications. Changes, therefore, in the construction and arrangement may be made without departing from the spirit and scope of the invention as defined in the appended claims.

What is claimed is:

1. A pointed heat-generating device for molds of injection molding machines, comprsing:
   a projectile heat-generating body;
   an elongated pointed heat-generating means being fixed to said projectile heat-generating body;
   means for generating heat upon application of an electric current and including a coiled heating wire arranged in said pointed heat-generating means;
   means for immediately transferring heat to said pointed heat-generating means and including a columnar body composed of a heat resisting and insulating material, said columnar body being disposed longitudinally within said pointed heat-generating means and being solid, said coiled heating wire being embedded longitudinally within said columnar body; and
   means for grounding said coiled heating wire to said pointed heat-generating means and including a lead wire conductively connected said coiled heating wire with said pointed heat-generating means.

2. A device as defined in claim 1, wherein said columnar body is composed of a ceramic as said heat resisting and insulating material.

3. A device as defined in claim 1, wherein said grounding means includes an electrically conductive tube surrounding said immediately transferring heat means.

4. A device as defined in claim 1, wherein said immediately tranferring heat means includes an insulating tube surrounding said columnar body.

5. A device as defined in claim 1, further comprising:
 means for providing a return path for electrical current and including said coiled heating wire being composed of double nichrome wire with two ends, said generating heat means including two lead wires arranged in the same direction from said two ends of said double nichrome wire.

6. A device as defined in claim 5, wherein one of said two lead wires is extended so as to contact said pointed heat generating means from outside said pointed heat generating means.

7. A device as defined in claim 1, wherein said coiled heating wire is composed of nichrome wire.

8. A device as defined in claim 7, wherein said nichrome wire has a diameter from 0.1 mm to 0.6 mm and said coiled heating wire has a coil winding diameter from 1.3 mm to 2 mm.

9. A device as defined in claim 1, wherein said coiled heating wire is formed so as to require a consumption of electrical power no greater than that for a current intensity of about 2.5 amperes and an electric voltage of about 4 volts.

10. A device as defined in claim 1, wherein said coiled heating wire is formed so that a temperature of said coiled heating wire is increasable from 900° C. to 1000° C.

11. A device as defined in claim 1, wherein said grounding means further includes an electrically conductive mass contacting said lead wire.

12. A device as defined in claim 1, wherein said pointed heat-generating means has a forward portion arranged forward longitudinally of said immediately transferring heat means, said forward portion having a conical shape with a pointed end constituting a tip, said columnar body having a conical shaped portion pointing toward said tip of said pointed heat-generating means.

13. A device as defined in claim 1, wherein said pointed heat-generating means has a forward portion arranged forward longitudinally of said immediately transferring heat means, said lead wire electrically connecting said pointed heat-generating means in said forward portion.

14. A device as defined in claim 1, further comprising:
 means for insulating said coiled heating wire from air to prevent burning and including said columnar body being composed of said insulating material and being formed to encase said coiled heating wire so that said coiled heating wire is embedded therein.

* * * * *